United States Patent
Horesh

(10) Patent No.: US 12,314,442 B2
(45) Date of Patent: May 27, 2025

(54) MULTI-DEVICE, MULTI-MODEL CATEGORIZATION SYSTEM

(71) Applicant: Intuit Inc., Mountain View, CA (US)

(72) Inventor: Yair Horesh, Kfar Sava (IL)

(73) Assignee: Intuit Inc., Mountain View, CA (US)

( * ) Notice: Subject to any disclaimer, the term of this patent is extended or adjusted under 35 U.S.C. 154(b) by 832 days.

(21) Appl. No.: 17/552,645

(22) Filed: Dec. 16, 2021

(65) Prior Publication Data
US 2023/0195931 A1     Jun. 22, 2023

(51) Int. Cl.
*G06F 16/00*     (2019.01)
*G06F 21/62*     (2013.01)
*G06N 20/00*     (2019.01)

(52) U.S. Cl.
CPC ......... *G06F 21/6254* (2013.01); *G06N 20/00* (2019.01)

(58) Field of Classification Search
CPC .... G06F 21/6254; G06F 16/34; G06F 16/355; G06F 16/313; G06F 16/358; G06N 20/00; G06N 20/10
See application file for complete search history.

(56) References Cited

U.S. PATENT DOCUMENTS

| | | | |
|---|---|---|---|
| 2020/0175052 A1* | 6/2020 | Wang | G06F 16/34 |
| 2023/0195931 A1* | 6/2023 | Horesh | G06F 21/6254 |
| | | | 726/26 |

* cited by examiner

*Primary Examiner* — Yicun Wu
(74) *Attorney, Agent, or Firm* — Lathrop GPM LLP

(57) ABSTRACT

A system includes a categorization application including a personal categorization model for execution on a user device, the personal categorization model configured to assign a personal assigned category and a personal assigned categorization confidence value to transaction record. The system also includes a global categorization model executing on a central server. The global categorization model is configured to receive the transaction record from the user device, and process the transaction record through the global categorization model to obtain a global assigned category and a global assigned categorization confidence value. The system is configured to select a transaction category from the personal assigned category and the global assigned category using the personal assigned categorization confidence value and the global assigned categorization confidence value, and categorize the transaction with the transaction category.

20 Claims, 4 Drawing Sheets

┌── 300 Personal Categorization Model Training Data

Check Card: HAPPIEST BABY, INC.
Kids

Apple Services
Entertainment

WOODMANS FOOD MARKET 0
Food & Dining

PAULSON'S FLOOR #4
Home

SQ *WALNUT CREEK FOCO LLCFort Home CO
Shopping

QuickPay with Zelle payment to M
Home

●
●
●

(1K records, all personal)

┌── 302 Global Categorization Model Training Data

ACH DEPOSIT ALBERT GREEN CKOMKN
Gifts & Donations

MONTGOMERY PLACE ORCHA RED HOOK NY
Food & Dining

TRI STATE PHARMACY
Health & Fitness

Cheap Pharmaceutical CREDIT ON 07/21
Health & Fitness

CONSUMER REMOTE DEPOSIT
Bills & Utilities

SILICON VALLEY LUXURY SAN JOSE CA
Home

●
●
●

(1M records, all global)

*FIG. 3*

MULTI-DEVICE, MULTI-MODEL CATEGORIZATION SYSTEM

BACKGROUND

Internet security includes not only blocking nefarious users from attacking data, but also ensuring data privacy of a software application's users. Data privacy is the act of keeping information about the user private, such as keeping the data exposed only to the user, while at the same time using the data to perform various software operations. The data that a user may want to keep private may be directly observable attributes or latent attributes in the data. Directly observable attributes are attributes that are expressly identified in the data. Latent attributes are the attributes of a user that can be calculated or otherwise interpreted from the observable attributes.

In the case of financial transaction records, while individual transaction records may not reveal much about the user, the collection of financial transaction records may reveal much more about user's habits and personal information. Furthermore, transaction categorization is generally performed by servers using powerful machine learning models that operate on numerous transaction records that can be tied to a single user. Thus, a challenge exists in maintaining security of the user's data while using the machine learning models.

SUMMARY

In general, in one aspect, one or more embodiments related to a computer-implemented method that includes a central server receiving a transaction record from a user device of a user. The user device generates a personal assigned transaction categorization using a personal categorization model, the personal assigned transaction categorization including a personal assigned category and a personal assigned categorization confidence value of assigning the transaction record to the personal assigned category. The central server also processes the transaction record through a global categorization model executing on the central server to obtain a global assigned category and a global assigned categorization confidence value. From the personal assigned category and the global assigned category, a transaction category is selected using the personal assigned categorization confidence value and the global assigned categorization confidence value, and the transaction is categorized with the transaction category.

In general, in one aspect, one or more embodiments related to a computer implemented method that includes a user device processing a transaction record through a personal categorization model executing on the user device to obtain a personal assigned category and a personal assigned categorization confidence value. The user device transmits, to a central server, the transaction record. From the central server, a global assigned category and a global assigned confidence value is received, where the central server generates the global assigned category and the global assigned categorization confidence value using a global categorization model. A transaction category is selected from the personal assigned category and the global assigned category using the personal assigned categorization confidence value and the global assigned categorization confidence value, and used to categorize the transaction.

In general, in one aspect, one or more embodiments related to a system that includes a categorization application including a personal categorization model for execution on a user device, the personal categorization model configured to assign a personal assigned category and a personal assigned categorization confidence value to transaction record. The system also includes a global categorization model executing on a central server. The global categorization model is configured to receive the transaction record from the user device, and process the transaction record through the global categorization model to obtain a global assigned category and a global assigned categorization confidence value. The system is configured to select a transaction category from the personal assigned category and the global assigned category using the personal assigned categorization confidence value and the global assigned categorization confidence value, and categorize the transaction with the transaction category.

Other aspects of the invention will be apparent from the following description and the appended claims.

BRIEF DESCRIPTION OF DRAWINGS

FIG. 3 shows an example in accordance with one or more embodiments.

DETAILED DESCRIPTION

Figure 1:
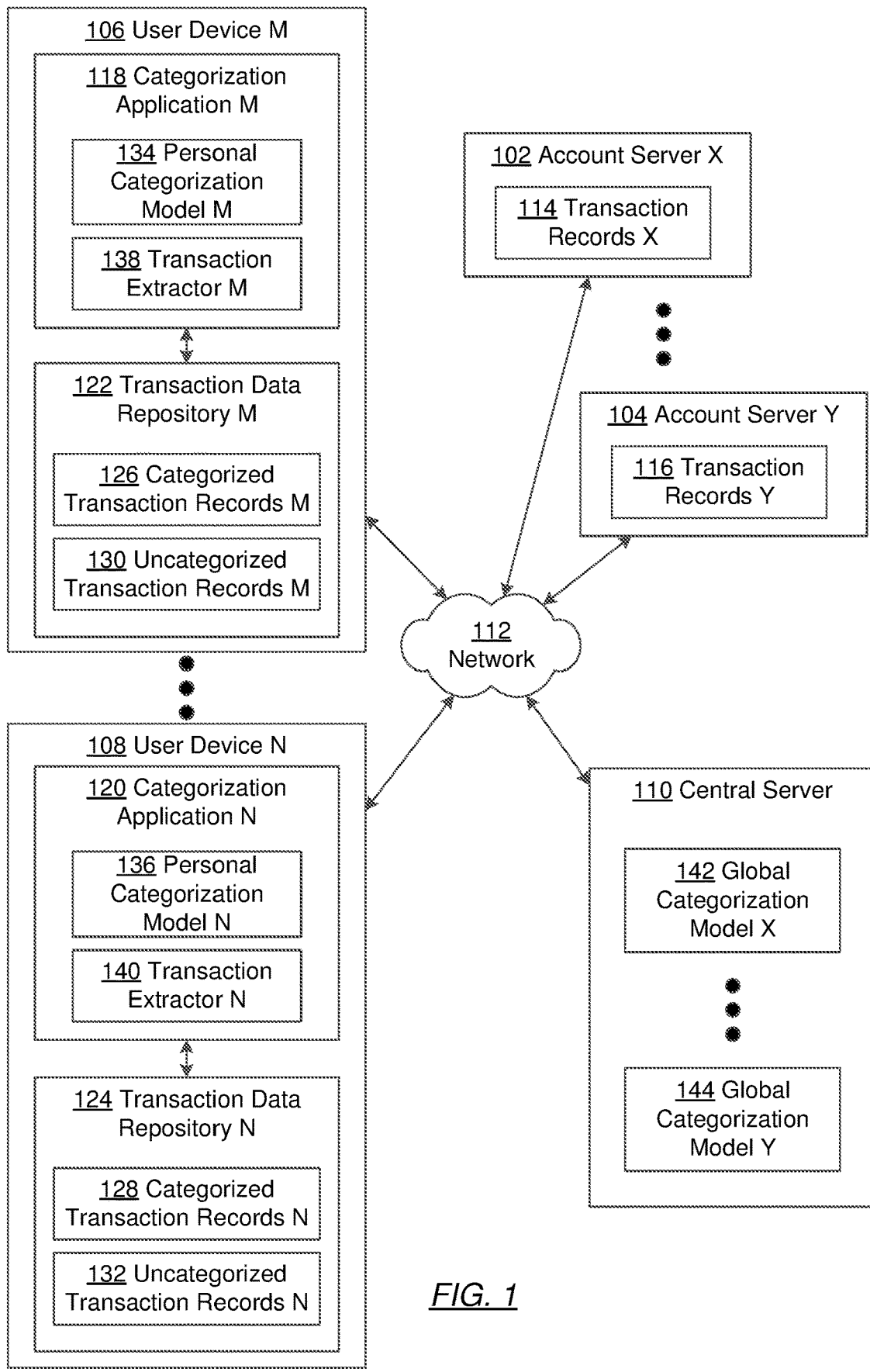
FIG. 1 shows a diagram of a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A problem exists when systems only locally perform automated categorizations in that not enough data exists for the computer to be accurate. In contrast, remote categorization can be a security vulnerability.

In general, embodiments of the invention are directed to data security through a two-tiered approach to machine learning model-based classification of transaction records. A first tier is a personal categorization model that is a machine learning model operating on a user device (i.e., local device of the user). A second tier is a global categorization model that is a machine learning model operating on a central server. An attempt is made to categorize the transaction through the personal categorization model to obtain a personal assigned category and a personal assigned categorization confidence value for the personal assigned category. If the personal assigned categorization confidence value suggests that the transaction may be incorrectly categorized, then transaction record for the transaction is sent to the central server. The central server applies the global categorization model to obtain a global assigned category. One of the personal assigned category and the global assigned category is then selected as the final category and assigned to the transaction. Because most transactions are processed locally, the security of the overall system may be increased. Further, because transactions with low confidence values may be processed through the global model, the data integrity of the system may be increased.

Turning to the FIGs, FIG. 1 shows a diagram of a system in accordance with one or more embodiments. As shown in FIG. 1, the system includes account servers (102, 104), user devices (106, 108), and a central server (110) connected via network (112). The account servers (102, 104), user devices (106, 108), and a central server (110) may each be one or more computing systems described below with reference to FIGS. 4A and 4B. The network (112) may be the network described below with reference to FIGS. 4A and 4B.

The account server (102, 104) is a third-party server that is configured to store transaction records for user accounts of multiple users. The account servers (102, 104) is one or more servers that store and control access to account information in the form of transaction records (114, 116). As discussed further below, the account server (102, 104) can include a web application with website for a user and third parties to access the account information. The account server (102, 104) generates and transmits messages related to the account information and based on a set of messaging preferences set by the user of the account. By way of an example, the account server (102, 104) is operated by a financial institution, such as a bank or stockbroker, to track and maintain financial accounts, such as checking accounts, debit card accounts, credit card accounts, savings accounts, stock portfolio accounts, etc. In one or more embodiments, the account server (102, 104) is operated by a web services provider to track access to web applications and services.

In one or more embodiments, account information includes a set of transaction records (114, 116) where each record identifies and describes a transaction with transaction data. Types of transactions include financial debit and credit transactions, including the purchase of a product or service. In one or more embodiments, transaction records (114, 116) includes values for one or more of a transaction type, a transaction amount, a transaction description, a transaction date, and a transaction balance.

User devices (106, 108) are connected via network (112) to the account servers (102, 104). The user device (106, 108) is operated by a user to interact with the account server (102, 104) and central server (110). The interactions may involve performing transactions and processing transaction records (114, 116). The user has an account that is maintained by the account server (102, 104). The transactions between the user and a provider can be performed with the user device (106, 108). These transactions generated by the user are recorded in the account maintained by the account server (102, 104).

The user device (106, 108) includes a transaction data repository (122, 124) and a categorization application (118, 120). The transaction data repository (122, 124) is any type of storage unit and/or device (e.g., a file system, database, collection of tables, or any other storage mechanism) for storing data. The transaction data repository (122, 124) includes uncategorized transaction records (130, 132) and categorized transaction records (126, 128). The uncategorized transaction records (130, 132) are transaction records (114, 116) that are not yet categorized. For example, the uncategorized transaction records (130, 132) may be transaction records (114, 116) obtained from one or more of the account servers (102, 104).

The categorized transaction records are the transaction records that are assigned a category. Being assigned a category means that at least one category identifier is linked in the transaction data repository to the transaction record. For example, the category identifier may be appended to the transaction record. The categories may be business categories, such as categorizing into a chart of accounts categories. As an example, the names of the categories may include "Reimbursable Expenses", "Advertising and Marketing", "Utilities", "Sales", "Accounts Payable", "Accounts Receivable", "Mortgages", "Loans", "Property, Plant, and Equipment (PP&E)", "Common Stock", "Services, "Wages and Payroll", etc. As another example, the category may be personal transaction categories, such as "housing", "transportation", "food", "utilities", "medical and healthcare", "savings", "debt payments", "recreation and entertainment", etc.

The categorization application (118, 120) is a software application that is configured to categorize transactions. The categorization application (118, 120) may include a transaction extractor (138, 140) and a personal categorization model (134, 136). The transaction extractor (138, 140) is configured to obtain transaction records from the account server (102, 104) and store the transaction records as uncategorized transaction records (130, 132) in the transaction data repository (122, 124).

The transaction extractor (138, 140) may operate by scraping transactions from a website of the account server (102, 104). Website scraping involves logging into the user's account using the website, and then traversing the web site to one or more transaction list page, extracting the textual contents from the one or more transaction list page, and then grouping the textual contents into individual transaction records based on locations of the textual contents, such as being in the same row of a table. As another example, the transaction extractor may operate by using an application programming interface (API) of the account server (102, 104). In accordance with the API, the transaction extractor (138, 140) issues a request to the account server (102, 104) for the list of transactions, and receives a response from the account server (102, 104) with the list of transactions.

The personal categorization model (134, 136) is a machine learning model that is configured to categorize transactions. The personal categorization model operates only on the user device. Thus, the user's complete transaction records do not leave the user's device. Similarly, private information about the user is not exposed by the personal categorization model outside of the user's device. The personal categorization model may be a pretrained model that is trained based on categorizations of anonymous transactions from a collection of users. As more data is available, such as by receiving the particular user's categorizations, the personal categorization model may be trained for the particular user. The output of the personal categorization model is a personal assigned category and a personal assigned categorization confidence value of assigning the transaction record to the personal assigned category. The personal assigned category is the category selected by the personal categorization model as being the most probable category for the transaction record. The personal assigned category confidence value is the probability that the transaction record is correctly categorized with the personal assigned category.

Continuing with FIG. 1, the user device (106, 108) is also connected, via the network (112), to the central server (110). The central server (110) is referred to as being central because the central server (110) is connected to multiple user devices of various users. The central server (110) is configured to execute a global categorization model. The global categorization model (142, 144) is a machine learning model that is used for multiple different users. The global categorization model may be trained using anonymized transaction records from the multiple different users. In one or more embodiments, the global categorization model (142, 144) may be used for only a subset of transactions for which categorization by the personal categorization model (134, 136) does not result in a selected category. The global categorization model (142, 144) includes functionality to output a global assigned category and a global assigned categorization confidence value. The global assigned category is the category selected by the global categorization model (142, 144) for the transaction record. The global assigned categorization confidence value is the probability that the global assigned category is correct for the transaction record as determined by the global categorization model (142, 144). Thus, the global assigned categorization confidence value is the confidence that the global categorization model has in the global assigned category.

Multiple global categorization models (142, 144) may exist. Each global categorization model (142, 144) may correspond to a demographic attribute value of the user. In one or more embodiments, in order to avoid exposure of too much personal information, only a minimum number of demographic attribute values is selected. For example, the minimum number may be one or two attributes. For example, the demographic attribute value may be the geographical location of the user. As another example, the demographic attribute value may be the number of members of the user's household, or the type of user (e.g., family, single person, corporation, organization, etc.). Other demographics may be used.

As described above, the global categorization model (142, 144) and personal categorization model (134, 136) are machine learning models, and may be the same type of model or different types of models. For example, the global categorization model (142, 144) may be a more robust model that takes more compute cycles than the personal categorization model. Different types of machine learning models may be used as the personal categorization model (134, 136) and global categorization model (142, 144) to categorize transactions. For example, a decision tree model operates by performing a sequence of tests at each node through a path of a decision tree from the root to a leaf node. The result of each test leads to a next node in the path until the leaf node is reached that identifies the category. The decision tree learns the tests and the order of the tests to identify the correct category.

By way of another example, an XGBoost model may be used. XGBoost is a decision tree-based ensemble machine learning model that uses a gradient boosting framework.

Another machine learning model that may be used is a recurrent neural network. The recurrent neural network model is a classifier model that has multiple layers of nodes. The recurrent neural network learns the weights to apply through layers of nodes through executing a loss function and back propagation. The output of the recurrent neural network is the probability that the node is in each category.

By way of another example, a Siamese neural network model may be used. The Siamese neural network model has separate encoder models to separately encode category information for each category and the transaction records to obtain a category intermediate vector for each category, and a transaction intermediate vector. A decoder model decodes the category intermediate vectors and the transaction intermediate vector to obtain decoder output for the transaction and categories. A selector selects, for a transaction decoder output, the category having the category decoder output that is the closest match to the transaction decoder output.

The above are only a brief description of some of the machine learning models that may be used as the personal categorization model (134, 136) and global categorization model (142, 144). Other types of machine learning models may be used without departing from the scope of the invention.

While FIG. 1 shows a configuration of components, other configurations may be used without departing from the scope of the invention. For example, various components may be combined to create a single component. As another example, the functionality performed by a single component may be performed by two or more components.

Figure 2:
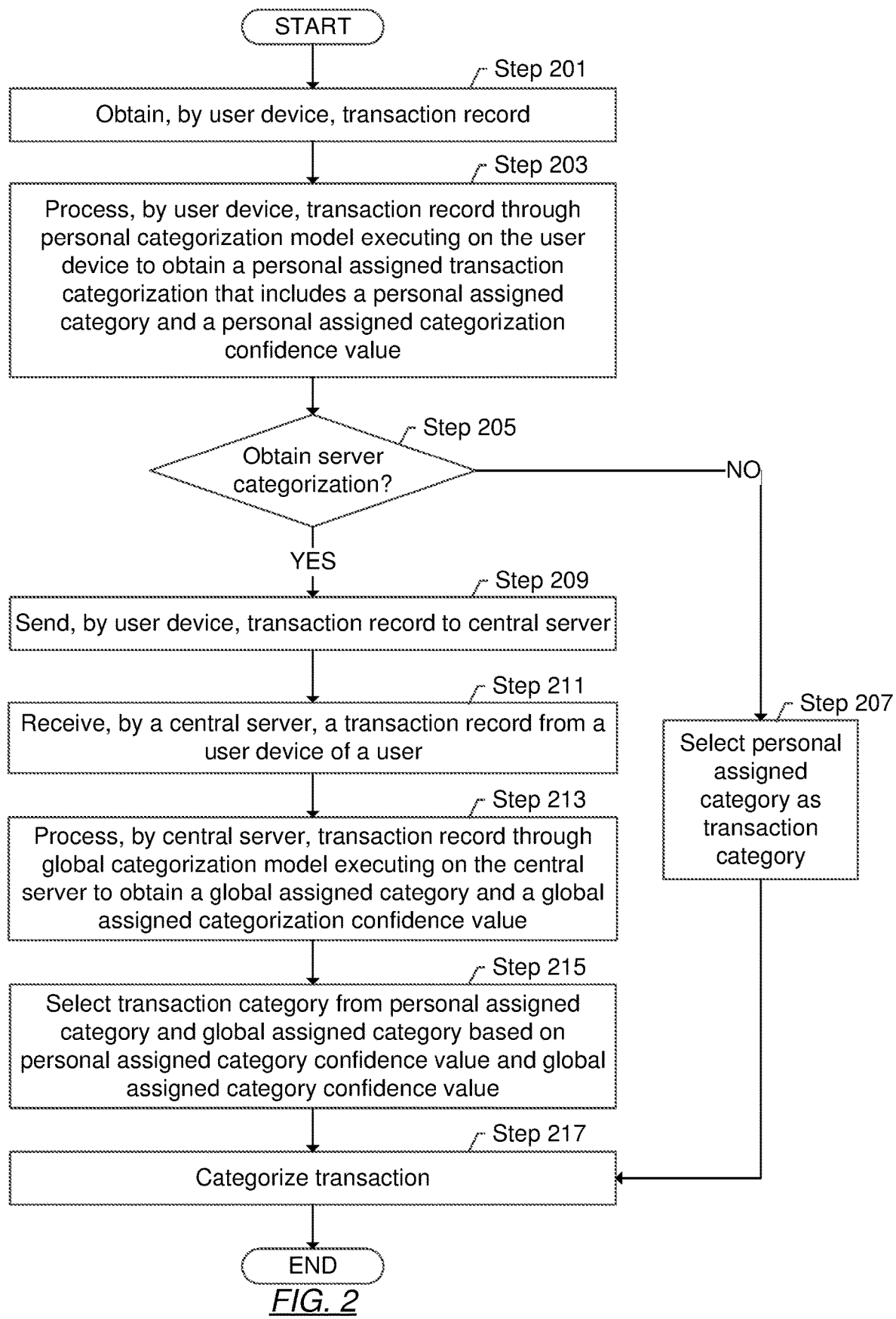
FIG. 2 shows a flowchart in accordance with one or more embodiments.

FIG. 2 shows a flowchart in accordance with one or more embodiments. While the various steps in this flowchart are presented and described sequentially, one of ordinary skill will appreciate that some or all of the steps may be executed in different orders, may be combined, or omitted, and some or all of the steps may be executed in parallel.

In Step 201, a transaction record is obtained. For example, the transaction extractor may perform website scraping to obtain the transaction record from the account server. As another example, the transaction extractor may use the API of the account server to obtain the transaction record. As another example, the user may acquire a file of transaction records, such as a comma separated value (CSV) file, and the transaction extractor may parse the file and save the transaction records in a local format. The categorization application on the user device may iterate through the transaction records to obtain and categorize transaction records.

In Step 203, the user device processes the transaction record through personal categorization model executing on the user device to obtain a personal assigned transaction categorization that includes a personal assigned category and a personal assigned categorization confidence value. The personal categorization model executing on the user device extracts features from the transaction record and generates a prediction of the correct category in the form of the personal assigned category. The personal categorization model also outputs the personal assigned categorization confidence value.

In Step 205, a determination is made whether to obtain a server categorization. The determination may be based on the personal assigned categorization confidence value. Specifically, the categorization application compares the personal assigned categorization confidence value with an acceptance threshold. If the personal assigned categorization confidence value fails to satisfy an acceptance threshold (e.g., is less than the acceptance threshold), then the determination is made to obtain the server categorization. In one or more embodiments, the acceptance threshold is a dynamic threshold. For example, initially, the acceptance threshold may be low in order to avoid sending too many transaction records to the central server. As the personal categorization model is more accurate, the acceptance threshold may be increased.

If a determination is made not to obtain server categorization, the personal assigned category is selected as the transaction category for the transaction record in Step 207. The transaction is categorized in Step 217 with the transaction category. Specifically, the transaction record is linked to an identifier of the transaction category in storage.

Returning to Step 205, if a determination is made to obtain server categorization, then user device sends the transaction record to a central server in Step 209. In Step 211, the central server receives the transaction record from the user device of the user. The transaction record may be sent after being anonymized. Namely, only the user device internet protocol (IP) address is sent with the transaction record for the purposes of responding to the request for categorization. Other user information, such as a user identifier, may be omitted. In another example, the transaction record may be sent with user information. Further, the anonymized transaction record may be sent with one or more demographic attribute values of the user. For example, the demographic attribute values may be a minimal number to select the global categorization model. Using the demographic attribute value, if any, the global categorization model is selected. If no demographic attribute values are sent, then a default global categorization model is used.

In Step 213, the central server processes the transaction record through the global categorization model executing on the central server to obtain a global assigned category and a global assigned categorization confidence value. The global categorization model processes the transaction record and generates a second prediction of the category for the transaction record. The second prediction is the global assigned category and the confidence value for the global assigned category.

In Step 215, a transaction category is selected from the personal assigned category and the global assigned category based on the personal assigned category confidence value and the global assigned category confidence value. In one or more embodiments, the category with the highest corresponding confidence value is selected. In some embodiments, when the global assigned category confidence value is greater than the personal assigned category confidence value, the difference between the respective confidence values is determined. If the difference is greater than a threshold, the global assigned category is selected. If the difference is not greater than the threshold, the personal assigned category is selected. Thus, the system gives a greater preference to the personal assigned category. The threshold may be a configurable or learned parameter value and is determine prior to categorization. In Step 217, the transaction is categorized as described above. In one or more embodiments, immediately after categorization, the transaction record is deleted. Thus, the central server does not store the transaction record.

Step 215 may be performed on the central server or the user device. If performed on the central server, the user device transmits the personal assigned transaction categorization to the central server, and the server outputs the transaction categorization. The server may also optionally output the global assigned transaction categorization for the purposes of training the personal categorization model. For example, the categorization application on the user device may use the global assigned category as the correct category to update the weights of the personal categorization model.

If Step 215 is performed on the user device, the global assigned transaction categorization with the global assigned category and the global assigned categorization confidence value is transmitted to the user device. The user device may perform the selection described above with reference to Step 215.

In one or more embodiments, the global categorization model is trained using anonymized transactions from several users. Further, rather than using the set of all the user's categorized transactions, only an intermittent subset of transactions are used. For example, the intermittent set may be one in every hundred transactions. In one or more embodiments, the personal categorization model is also pretrained by the central server using the anonymized transactions from multiple users. After pretraining, the central server may send the personal categorization model to the user device. The user device may perform additional training during use, such as when receiving updated categorization from the user or the central server.

In some embodiments, the transaction extraction is performed on the central server. The central server may include code to acquire transaction records from the various different account servers. In such a scenario, the central server obtains the transaction records, reformats the transaction records to a communication format for the transaction data repository on the user device, and sends the transaction records to the user device. Immediately after sending (e g, immediately after receipt of confirmation of receiving the transaction records), the transaction records are deleted on the central server. Thus, the central server does not maintain the transaction records.

FIG. 3 shows an example in accordance with one or more embodiments. In the example, the personal categorization model training data (300) includes one thousand transaction records of a particular user that have assigned categories. The global categorization model training data (302) include one million transaction records that are from multiple users (global) and have categories assigned. Both the personal categorization model and the global categorization model process the respective training data to generate respective trained models. In the example, consider the scenario in which a new transaction record is received. The new transaction record has the description, "FL VAC PHARMA HOUSE." The personal categorization model has not processed "Pharma" stores yet, so the personal categorization model issues 'shopping' as the personal assigned category because of the similarly between 'house' and 'home' that exist in a single data point. The personal assigned categorization confidence value is low at 0.2.

Because the personal assigned categorization confidence value is below a threshold, the global categorization model is used. The transaction record for the new transaction is sent to the central server. The central server has been trained with multiple transaction records that has "Pharma" in the description (e.g., "TRI STATE PHARMACY" and "Cheap Pharmaceutical CREDIT ON 07/21"). The multiple transaction records are generally assigned the "Health and Fitness" category. Thus, the global categorization model returns the global assigned category of "Health and Fitness" with the global assigned categorization confidence value of 0.8. The central server deletes the transaction record immediately after sending.

Because the global assigned category and the personal assigned category are different, the user device selects the transaction category based on the respective confidence values. The user device selects the global assigned category since the global assigned categorization confidence value is more than a threshold confidence higher than the personal assigned categorization confidence value. Further, the now categorized new transaction record may be used to train the personal categorization model. Thus, future transactions with "Pharma" may not be sent to the central server.

Figure 4A:
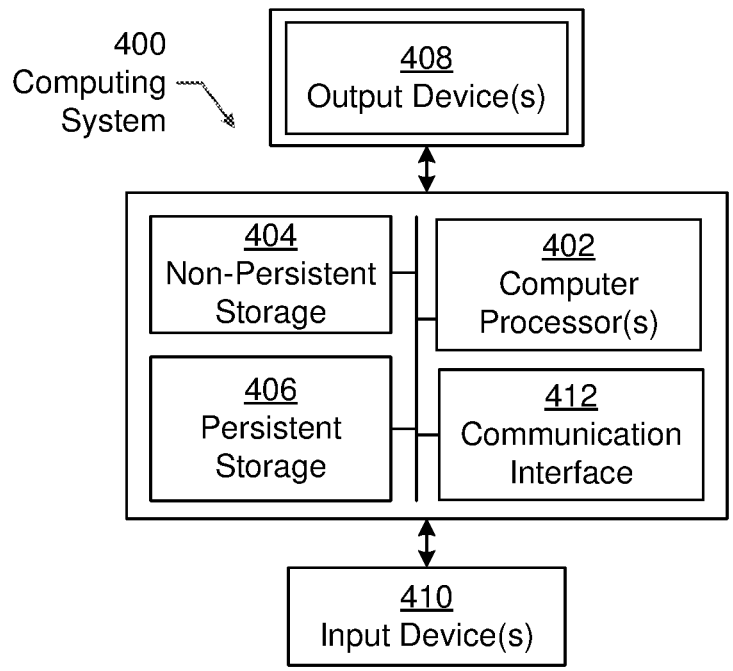
FIG. 4A and FIG. 4B show a computing system in accordance with one or more embodiments of the invention.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, global, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a personal area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be personal or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
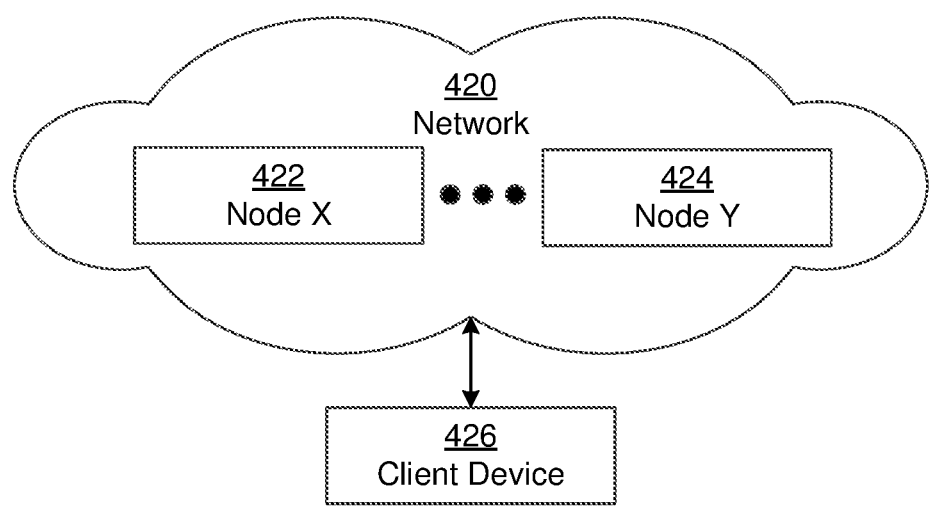

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a global chassis that is connected to other nodes via a backplane. By way of another example, the node may correspond to a global in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIG. 4A and FIG. 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-global networking model, sockets may serve as interfaces or communication channel endpoints enabling bidirectional data transfer between processes on the same device. Foremost, following the client-global networking model, a global process (e.g., a process that provides data) may create a first socket object. Next, the global process binds the first socket object, thereby associating the first socket object with a unique name and/or address. After creating and binding the first socket object, the global process then waits and listens for incoming connection requests from one or more client processes (e.g., processes that seek data). At this point, when a client process wishes to obtain data from a global process, the client process starts by creating a second socket object. The client process then proceeds to generate a connection request that includes at least the second socket object and the unique name and/or address associated with the first socket object. The client process then transmits the connection request to the global process. Depending on availability, the global process may accept the connection request, establishing a communication channel with the client process, or the global process, busy in handling other operations, may queue the connection request in a buffer until global process is ready. An established connection informs the client process that communications may commence. In response, the client process may generate a data request specifying the data that the client process wishes to obtain. The data request is subsequently transmitted to the global process. Upon receiving the data request, the global process analyzes the request and gathers the requested data. Finally, the global process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a global operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the global may extract the data regarding the particular selected item and send the data to the device that initiated the request. Once the user device has received the data regarding the particular item, the contents of the received data regarding the particular item may be displayed on the user device in response to the user's selection. Further to the above example, the data received from the global after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any personal parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method comprising:
   receiving, by a central server, a transaction record from a user device of a user, wherein the user device generates a personal assigned transaction categorization using a personal categorization model, the personal assigned transaction categorization comprising a personal assigned category and a personal assigned categorization confidence value of assigning the transaction record to the personal assigned category;
   processing, by the central server, the transaction record through a global categorization model executing on the central server to obtain a global assigned category and a global assigned categorization confidence value;
   selecting a transaction category from the personal assigned category and the global assigned category using the personal assigned categorization confidence value and the global assigned categorization confidence value; and
   categorizing the transaction with the transaction category.

2. The computer-implemented method of claim 1, wherein the personal categorization model is trained using transaction performed by the user, and wherein the global categorization model is trained using anonymized transactions of a plurality of users.

3. The computer-implemented method of claim 1, wherein the global categorization model is different type of model than the personal categorization model.

4. The computer-implemented method of claim 1, further comprising:
   deleting the transaction record immediately after categorizing the transaction with the transaction category.

5. The computer-implemented method of claim 1, further comprising:
   receiving a demographic attribute value of the user; and
   selecting, from a plurality of global categorization models executing on the central server, the global categorization model based on the global categorization model matching the demographic attribute value.

6. The computer-implemented method of claim 1, further comprising:
   calculating a difference between the personal assigned categorization confidence value and the global assigned categorization confidence value; and
   selecting the global assigned category as the transaction category when the difference is greater than a threshold.

7. The computer-implemented method of claim 1, further comprising:
   receiving, by the central server, an intermittent subset of a plurality of personal assigned transaction categorizations from a plurality of user devices; and
   training the global categorization model using the intermittent subset.

8. The computer-implemented method of claim 1, further comprising:
   training, by the central server, the personal categorization model with a set of anonymized personal assigned transaction categorizations from a plurality of users;
   sending, after training, the personal categorization model to the user device.

9. The computer-implemented method of claim 1, further comprising:

obtaining, by the central server, a plurality of transaction records from a plurality of account servers having a user account of the user;

transmitting the plurality of transaction records to the user device; and deleting, immediately after transmitting, the plurality of transaction records.

10. A computer implemented method comprising:

processing, by a user device, transaction record through a personal categorization model executing on the user device to obtain a personal assigned category and a personal assigned categorization confidence value;

transmitting, by the user device to a central server, the transaction record;

receiving, from the central server, a global assigned category and a global assigned confidence value, wherein the central server generates the global assigned category and the global assigned categorization confidence value using a global categorization model;

selecting a transaction category from the personal assigned category and the global assigned category using the personal assigned categorization confidence value and the global assigned categorization confidence value; and categorizing the transaction with the transaction category.

11. The computer implemented method of claim 10, further comprising:

comparing the personal assigned categorization confidence value to an acceptance threshold, wherein transmitting the transaction record to the central server is based on the personal assigned categorization confidence value failing to satisfy the acceptance threshold.

12. The computer implemented method of claim 10, wherein the personal categorization model is trained using transaction performed by the user, and wherein the global categorization model is trained using anonymized transactions of a plurality of users.

13. The computer implemented method of claim 10, wherein the global categorization model is different type of model than the personal categorization model.

14. The computer implemented method of claim 10, further comprising:

transmitting a demographic attribute value of the user to the central server, wherein the central server selects, from a plurality of global categorization models executing on the central server, the global categorization model based on the global categorization model matching the demographic attribute value.

15. The computer implemented method of claim 10, further comprising:

calculating a difference between the personal assigned categorization confidence value and the global assigned categorization confidence value; and selecting the global assigned category as the transaction category when the difference is greater than a threshold.

16. The computer implemented method of claim 10, further comprising:

training the personal categorization model with a set of anonymized personal assigned transaction categorizations from a plurality of users.

17. The computer implemented method of claim 10, further comprising:

obtaining, by the user device, a plurality of transaction records from a plurality of account servers having a user account of the user; and categorizing the plurality of transaction records using the personal categorization model.

18. A system comprising:

a categorization application comprising:

a personal categorization model for execution on a user device, the personal categorization model configured to assign a personal assigned category and a personal assigned categorization confidence value to transaction record; and a global categorization model executing on a central server, the global categorization model configured to:

receive the transaction record from the user device, and process the transaction record through the global categorization model to obtain a global assigned category and a global assigned categorization confidence value, wherein the system is configured to:

select a transaction category from the personal assigned category and the global assigned category using the personal assigned categorization confidence value and the global assigned categorization confidence value, and categorize the transaction with the transaction category.

19. The system of claim 18, wherein the personal categorization model is trained using transaction performed by the user, and wherein the global categorization model is trained using anonymized transactions of a plurality of users.

20. The system of claim 18, wherein the global categorization model is different type of model than the personal categorization model.

* * * * *